United States Patent
Burdette et al.

(10) Patent No.: US 7,076,912 B2
(45) Date of Patent: Jul. 18, 2006

(54) FLY PACK APPARATUS AND METHOD

(76) Inventors: Doyle Malvin Burdette, 421 Woolridge Way, Greer, SC (US) 29650; Monty McKinney Kirby, 213 Silver Lake Rd., Duncan, SC (US) 29334; Jeffrey Falkner Wilkes, 17 W. Earle St., Greenville, SC (US) 29609

( * ) Notice: Subject to any disclaimer, the term of this patent is extended or adjusted under 35 U.S.C. 154(b) by 0 days.

(21) Appl. No.: 10/777,395

(22) Filed: Feb. 12, 2004

(65) Prior Publication Data

US 2005/0178046 A1    Aug. 18, 2005

(51) Int. Cl.
*A01K 97/06* (2006.01)

(52) U.S. Cl. .................. 43/54.1; 206/315.11

(58) Field of Classification Search .............. 43/54.1, 43/57.1, 57.2; 206/315.11; 224/920, 237
See application file for complete search history.

(56) References Cited

U.S. PATENT DOCUMENTS

| | | | |
|---|---|---|---|
| 206,206 A | 7/1878 | Yerrinton | |
| 742,040 A * | 10/1903 | Kurtz, Sr. ................ | 43/57.2 |
| 891,055 A | 6/1908 | Frost | |
| 1,094,009 A * | 4/1914 | Parkhurst ................ | 206/373 |
| 1,231,165 A * | 6/1917 | Jay ........................ | 43/57.1 |
| 1,414,875 A * | 5/1922 | Hanaford ................ | 206/315.4 |
| 1,556,127 A * | 10/1925 | Pruett ..................... | 224/241 |
| 1,736,343 A * | 11/1929 | Hawes .................... | 43/57.1 |
| 2,548,680 A * | 4/1951 | Thorn ..................... | 224/663 |
| 2,707,583 A * | 5/1955 | Keilholz ................. | 224/237 |
| 2,795,890 A | 6/1957 | Metsker | |
| 2,975,888 A * | 3/1961 | Paynton, Sr. ........... | 206/771 |
| 2,978,830 A | 4/1961 | Killian | |
| 3,115,723 A * | 12/1963 | Kline ..................... | 43/57.2 |
| 3,213,564 A * | 10/1965 | Borell .................... | 43/57.2 |
| 3,639,021 A * | 2/1972 | Fee ........................ | 312/234.1 |
| 4,030,228 A | 6/1977 | Schaefers | |
| 4,372,073 A * | 2/1983 | Goldman ................ | 43/57.1 |
| D273,816 S * | 5/1984 | Cerasari ................. | D3/299 |
| 4,467,551 A | 8/1984 | Pulver | |
| 4,563,834 A | 1/1986 | Spencer | |
| 4,681,220 A * | 7/1987 | Beneke .................. | 206/315.11 |
| 4,691,469 A * | 9/1987 | Alsobrook et al. ...... | 43/54.1 |
| 4,825,584 A * | 5/1989 | Raley .................... | 43/57.1 |
| 4,970,821 A | 11/1990 | Young | |
| 5,009,346 A * | 4/1991 | Butler .................... | 224/605 |
| 5,297,676 A * | 3/1994 | Coleman ................ | 206/315.11 |
| 5,425,194 A * | 6/1995 | Miller .................... | 43/26 |
| 5,454,185 A | 10/1995 | Love | |
| 5,470,001 A * | 11/1995 | Konchan ................ | 224/673 |

(Continued)

*Primary Examiner*—Teri Pham Luu
*Assistant Examiner*—Kimberly S. Smith
(74) *Attorney, Agent, or Firm*—Luis E. Arri

(57) ABSTRACT

Apparatus and method are illustrated for a fly pack comprising an openable drum (A) including an interior and exterior drum surface; a fastening (B) for operably securing the fly pack in drum form; a fly nap (C) carried by the interior drum surface for releasably engaging the hook portion of flies; a band (D) carried by the exterior drum surface including at least one band tip overlapping the exterior drum surface; at least one end cap (E) affixed to a band tip overlapping the exterior drum surface for operably enclosing a drum end when in drum form; and an attachment (F) carried by the exterior drum surface for securing the fly pack to an angler, whereby the fly pack can be opened and accessed at either end or unfastened and opened entirely for access to the flies secured upon the fly nap.

48 Claims, 5 Drawing Sheets

U.S. PATENT DOCUMENTS

| | | | | |
|---|---|---|---|---|
| 5,584,138 A | * | 12/1996 | Newberg | 43/57.1 |
| 5,598,658 A | * | 2/1997 | Walker | 43/25.2 |
| 5,632,113 A | * | 5/1997 | Raymond et al. | 43/54.1 |
| 5,651,141 A | * | 7/1997 | Schneider | 2/94 |
| 5,950,352 A | * | 9/1999 | Volmer | 43/54.1 |
| 5,967,315 A | * | 10/1999 | Langtry, II | 206/315.11 |
| 6,023,876 A | * | 2/2000 | Haddad et al. | 43/25.2 |
| 6,301,826 B1 | | 10/2001 | Thorpe | |
| 6,513,692 B1 | * | 2/2003 | Forgosh et al. | 224/575 |

* cited by examiner

FLY PACK APPARATUS AND METHOD

BACKGROUND OF THE INVENTION

This invention relates to portable storage systems for fishing tackle. More specifically, the invention relates to a fly pack for the temporary storage and simple retrieval of fly fishing flies and streamers.

Fly fishing flies are categorized on the basis of whether they float or sink. Those flies that are designed to float on the water, or in its surface film, are called dry flies. Those that are designed to sink under the water surface are commonly and collectively referred to as wet flies. After use, dry flies require proper drying to maintain the proper hydrophobic properties which allow them to "float" on the water. When dry files absorb moisture, they will not float. Wet files must also be dried to properly preserve the tackle and avoid rusting of the hook.

Fly choice can be baffling to even the most experience anger, as the feeding tendencies may vary among the fish species, and can further vary based upon the geographical region, the time of year and water conditions. As such, the fly fishing angler be ready with a plethora of flies to properly match the fish=s feeding tendencies. Often the fly fishing must change flies, literally midstream, while also manipulating a rod and a host of other fishing tackle and accessories. Thus, quick and easy access to a variety of flies is important to the angler.

Heretofore, fly fishing anglers were limited to boxes for the transport and storage of flies. These devices required flies to be stored in the box, and as used, had to be returned to the box wet or placed on a vest or hat to dry before being returned to the box. used, and upon retrieving the box, must poke through a disorganized mass of flies before finding the fly of choice. These devices are not easily accessible by the angler and are cumbersome for the angler to use; especially with hands that are wet or numb. This prior art is best exemplified by U.S. Pat. Nos. 6,301,826; 5,555,671; and 5,025,588.

Other devices have attempted to solve the inherent problems associated with box storage devices. Some devices disclosed a fishing lure storage system formed into closeable booklet form, while others disclosed arm or wrist-mounted lure storage devices comprising an arm or wrist band and a layer of plaint material for holding fish hooks. These devices too are not easily accessible by the angler, and again are cumbersome for the angler to use. The booklet forms, best exemplified by U.S. Pat. Nos. 6,301,386; 5,806,236; and 4,467,551; are not mountable to the angler=s body, employ cumbersome inner flaps or pockets, and require the angler to stow the booklet either in a pocket or separate pocket when not in use. The arm-mounted forms are best exemplified by U.S. Pat. Nos. 5,454,185 and 2,978,830, practically render the hand upon the arm upon which the device is mounted useless, forcing the angler to forage single-handedly for a fly, while managing his rod and other equipment.

What is needed therefore is a mountable fly pack for the temporary storage and simple retrieval of fly fishing streamers.

SUMMARY OF THE INVENTION

An important object of this invention is to provide a mountable fly pack for the temporary storage and simple retrieval of fly fishing flies and streamers.

Another important object of the invention is to provide a fly pack that can store any type of fly or streamer without damaging the tackle.

Yet another important object of the invention is to provide fly pack fastenable in drum form.

Still another important object of the invention is to provide a fly pack that can be opened via end caps so an interior fly nap may be accessed through either and while maintaining the fly pack fastened in a drum form.

Another important object of the invention is to provide a fly pack that can be unfastened and opened entirely for access to the flies or streamers secured upon the fly nap.

Yet another important object of the invention is to provide a fly pack that allows for adequate ventilation within the pack for speedy drying of the stored flies or streamers.

Still another important object of the invention is to provide a fly pack fastened in drum form, in which one or more end caps may be opened to permit ambient air to circulate within the fly pack to speed the drying of the stored flies or streamers.

Another important object of the invention is to provide a fly pack with a variety of attachments for mounting the fly pack to an angler.

Accordingly, the fly pack constructed in accordance with the invention permits the temporary storage and simple retrieval of fly fishing flies. The fly pack comprises an openable drum A including an interior drum surface and an exterior drum surface; a fastening B for operably securing the fly pack in drum form; a fly C carried by the interior drum surface for releaseably engaging the hook portion of flies to removably d secure to flies to the pack; a band D carried by the exterior drum surface including at least one band tip overlapping the exterior drum surface; at least one end cap E affixed to a band tip overlapping the exterior drum surface for operably enclosing a drum end when in drum form; and an attachment F carried by the exterior drum surface for securing the fly pack to a fisherman, whereby the fly pack can be open and accessed at either end or unfastened and opened entirely for access to the flies secured upon the fly nap.

BRIEF DESCRIPTION OF THE DRAWINGS

The construction designed to carry our the invention will hereinafter be desrcibed, together with features thereof.

The invention will be more readily understood from reading of the following specification and by reference to the accompany drawings forming a part thereof, wherein an example of the invention is shown and wherein.

DETAILED DESCRIPTION

Figure 1:
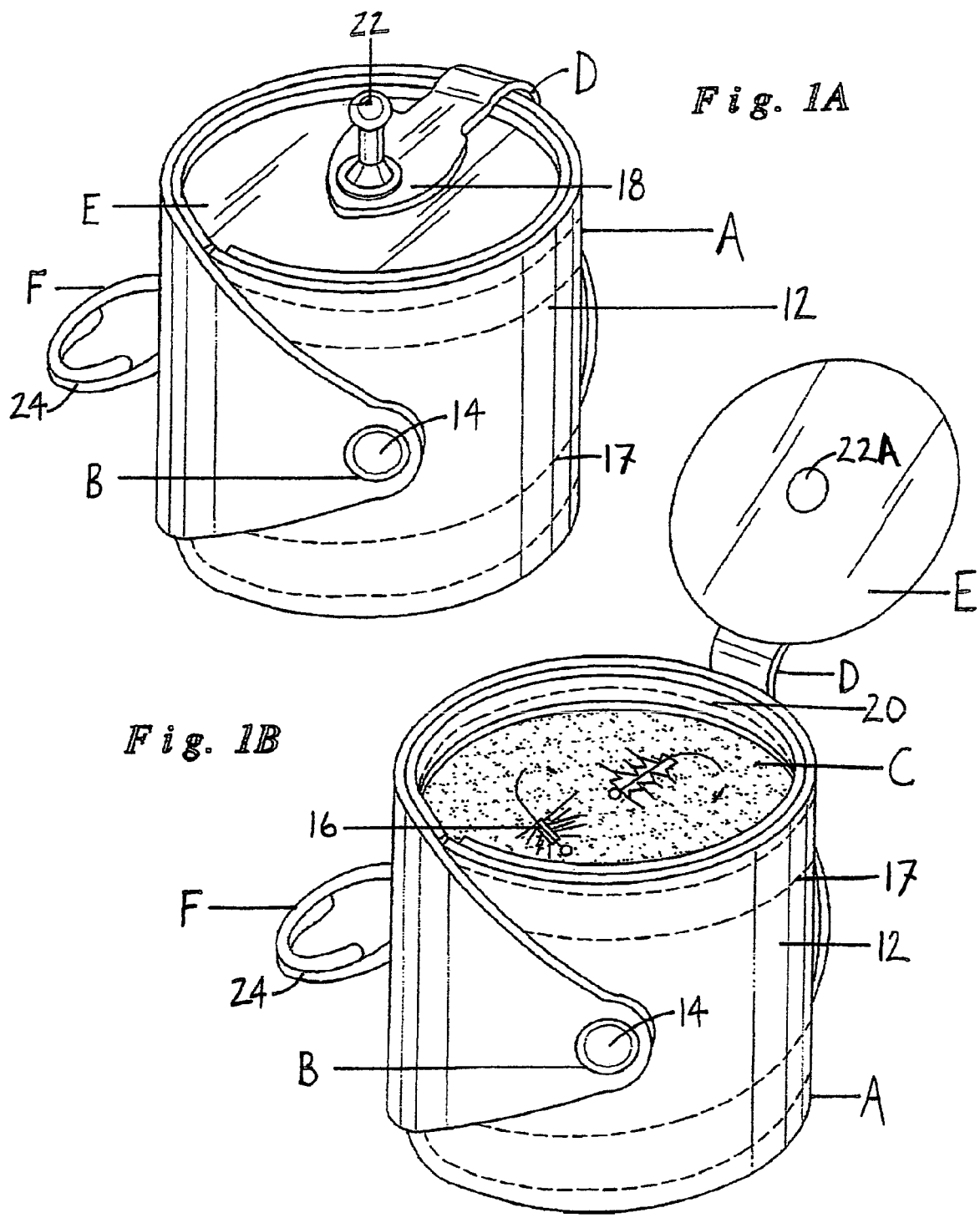
FIG. 1A is a front perspective view illustrating a fastened and enclosed fly pack constructed in accordance with the invention.
FIG. 1B is a front perspective view illustrating a fastened but unenclosed fly pack constructed in accordance with the invention.
Figure 2:
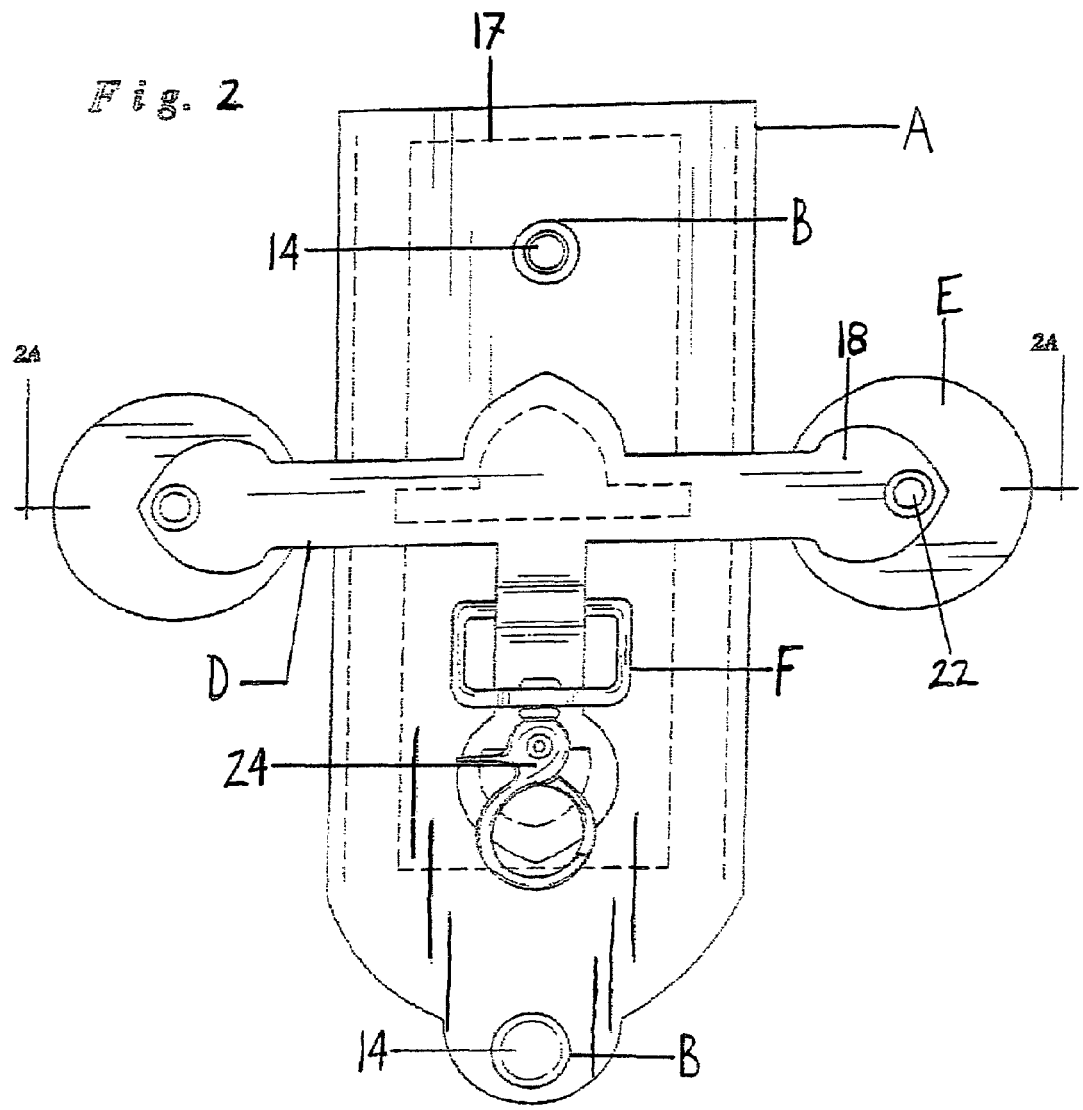
FIG. 2 is a top plan view illustrating an unfastened and unenclosed fly pack constructed in accordance with the invention.
Figure 2A:
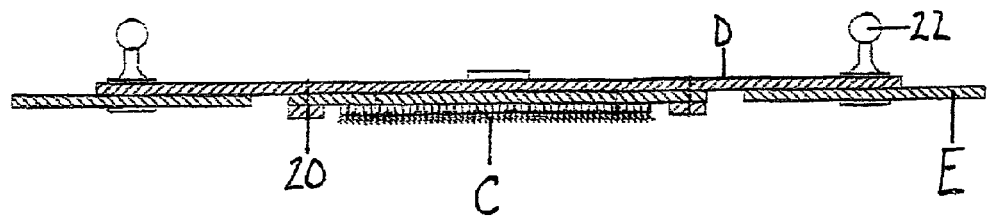
FIG. 2A is a longitudinal sectional view through line 2A of FIG. 2 illustrating an unfastened and unenclosed fly pack constructed in accordance with the invention.
Figure 3:
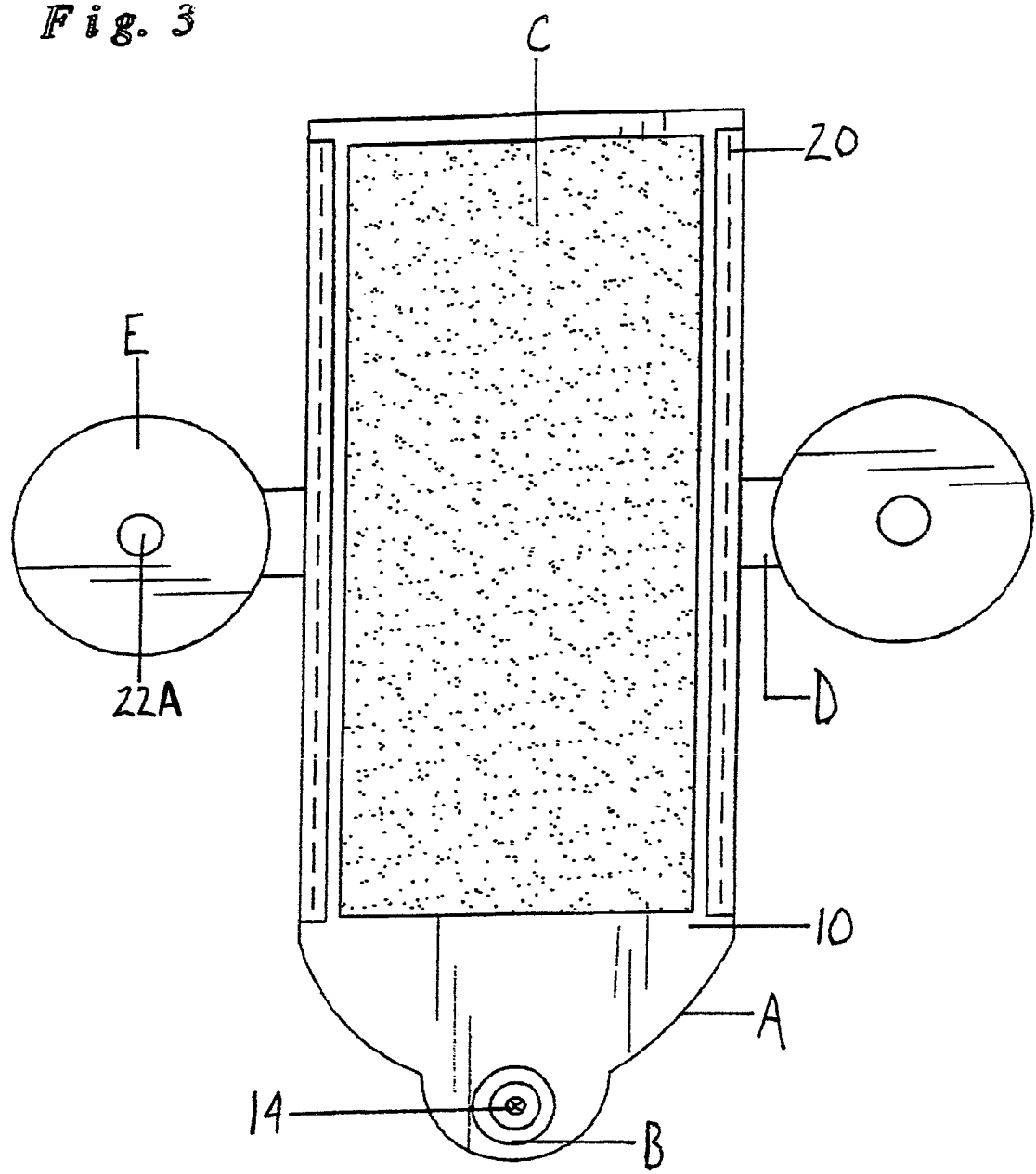
FIG. 3 is a bottom plan view illustrating an unfastened and unenclosed fly pack constructed in accordance with the invention.
Figure 4A:
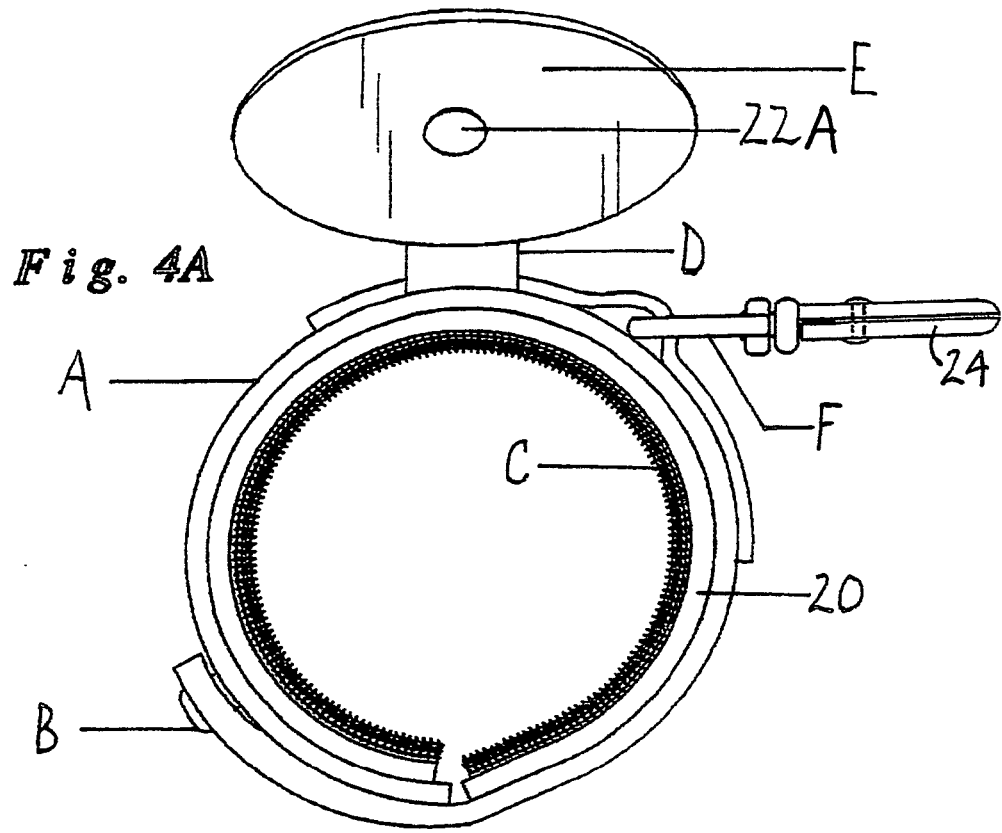
FIG. 4A is a top plan view illustrating a fastened but unenclosed fly pack constructed in accordance with the invention.
Figure 4B:
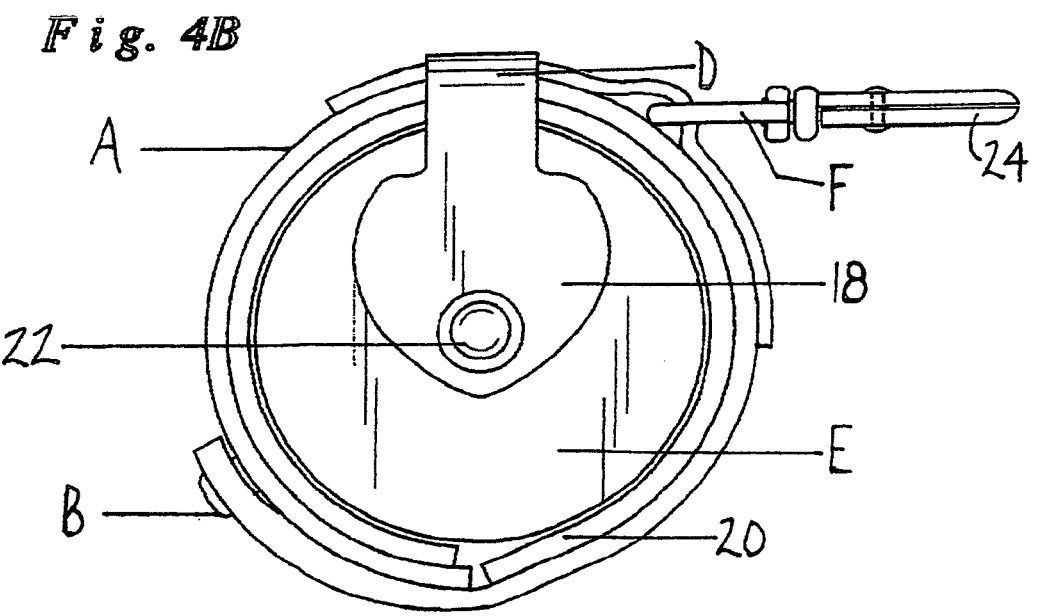
FIG. 4B is a top plan view illustrating a fastened and enclosed fly pack constructed in accordance with the invention.
Figure 5:
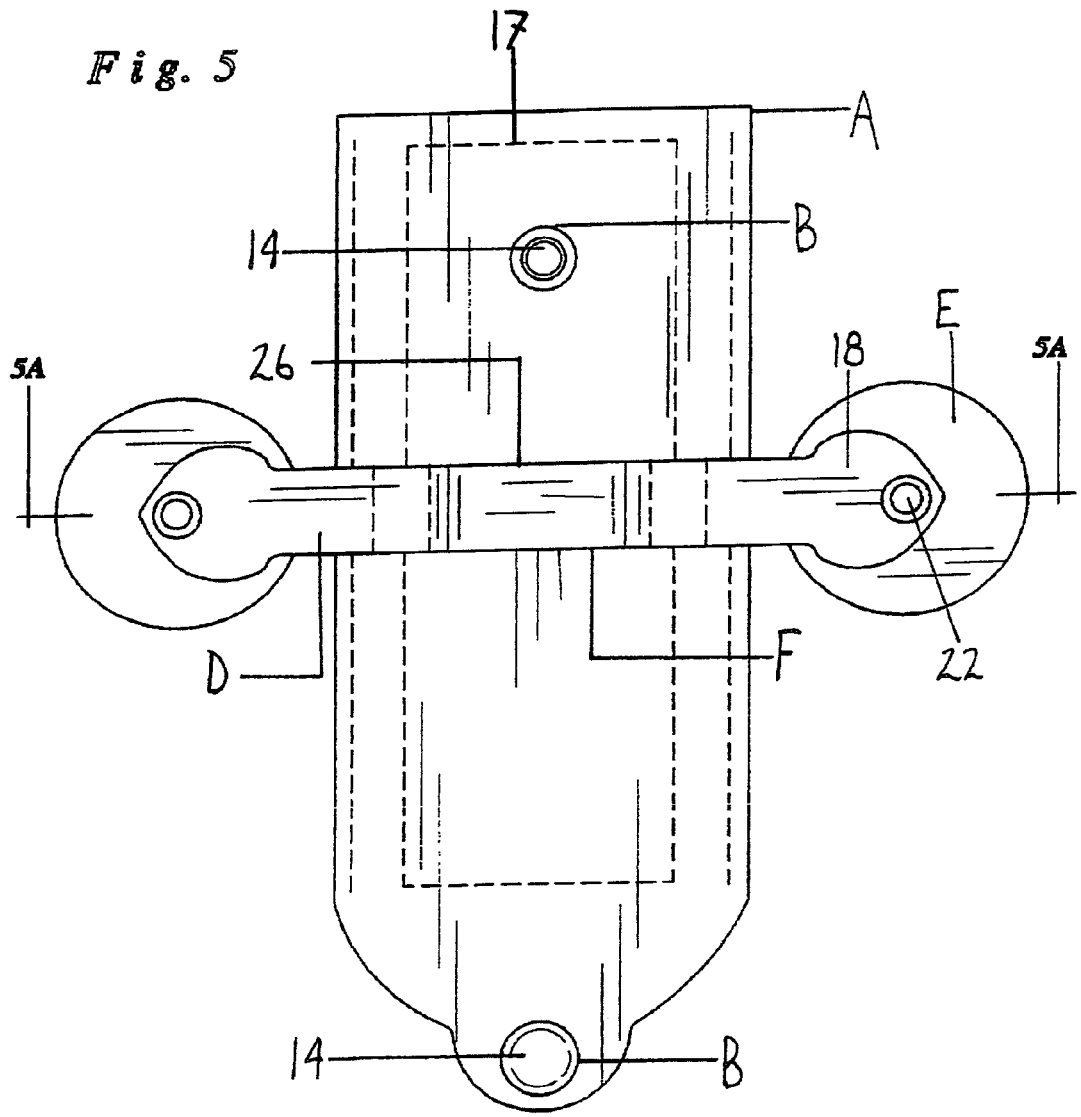
FIG. 5 is a top plan view illustrating an alternate embodiment of the invention including a belt loop attachment wherein the fly pack constructed in accordance with the invention is unfastened and unenclosed.
Figure 5A:
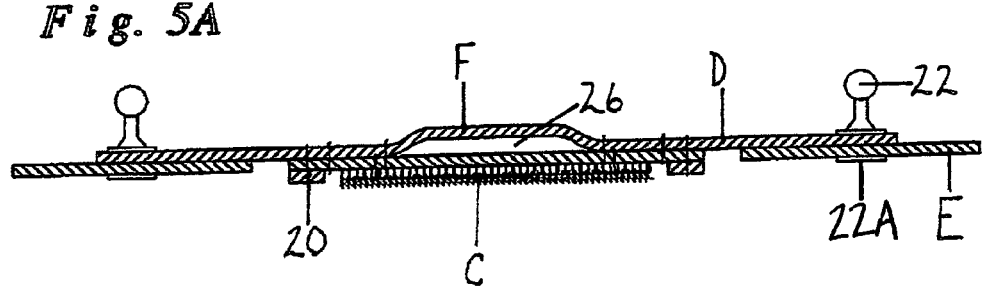
FIG. 5A is a longitudinal sectional view through line 5A of FIG. 5 illustrating an alternate embodiment of the invention including a belt loop attachment wherein the fly pack constructed in accordance with the invention is unfastened and unenclosed.

The drawings illustrate a fly pack for the temporary storage and simple retrieval of fly fishing flies comprising an openable drum A including an interior drum surface and an exterior drum surface; a fastening B for operably securing the fly pack in drum form; an fly nap C carried by the interior drum surface for releaseably engaging the hook portion of flies to removably secure the flies to the fly pack; a band D carried by the exterior drum surface including at least one band tip overlapping the exterior drum surface including at least one band tip overlapping the exterior drum surface; at least one end cap E affixed to a band tip overlapping the exterior drum surface for operably enclosing a drum end when in drum form; and an attachment F carried by the exterior drum surface for securing the fly pack to a fisherman, whereby the fly pack can be opened and accessed at either end or unfastened and opened entirely for access to the flies secured upon the fly nap.

Drum A is openable and includes an interior drum surface 10 and an exterior drum surface 12. A preferred material for the construction of drum A is weather resistant leather, although the drum may also be constructed of ballistic nylon.

Fastening B operably secures the fly pack in drum form. The fastening preferably comprises snap fasteners 14 for securement to corresponding snap fastener elements, although the fastening may also comprise Velcro® type hook and loop fastener elements or quick-snap fastener elements.

Fly nap C is carried by the interior drum surface 10 for releaseably engaging the hook portion of flies 16 to removably secure the flies to the fly pack. In a preferred embodiment the fly nap comprises wool fleece and is stitched to the interior drum surface, although the fly nap may alternatively be bonded to the interior drum surface. The fly nap may further alternately comprise a synthetic fleece or closed cell foam, either of which may be stitched or bonded to the interior drum surface.

The band D is carried by the exterior drum surface 12 and includes at least one band tip 18 that overlaps the exterior drum surface. In a preferred embodiment the band is stitched to the exterior drum surface, although the band may alternatively be bonded to the exterior drum surface. The band preferably flexibly hinges about the band tips 18.

End caps E are preferably affixed to a band tip 18 overlapping the exterior drum surface 12 for operably enclosing a drum end when in drum form. In a preferred embodiment there are two end caps E affixed to two overlapping band tips 18. The flexible band tips provide the hinging action to allow the end caps to operate similar to doors for enclosing the ends of the fly pack when in drum form. In a preferred embodiment the end caps are stitched to the band tip, although they may also be bonded or riveted to the band tip.

The interior drum surface 10 preferably further comprises a pair of oppositely disposed raised billets 20 for operably securing the end caps E enclosing the drum end when the fly pack is in drum form. The raised billet receives the circumferential edges of the end cap E and operably secures the end cap in a closed position enclosing a drum end. The end caps E preferably further comprise a pull knob 22 to assist an angler in opening or enclosing a drum end with the end cap when the fly pack is in drum form.

Attachment F is carried by the exterior drum surface 12 for optionally securing the fly pack to an angler. In a preferred embodiment the attachment F comprises a clasp 24 for attaching the fly pack to an angler. Alternatively, the attachment F may comprise a belt loop 26 capable of receiving the belt of an angler for attaching the fly pack to the angler's belt. Attachment F may further comprise Velcro® type hook and loop fastener elements, quick-snap fastener elements, or slip ring elements to secure the fly pack to an angler. In the absence of attachment F, the angler may place the fly pack in a vest, shirt or pant pocket or in a variety of tackle boxes or equipment packs.

The fly pack constructed in accordance with the invention permits the temporary storage and simple retrieval of fly fishing flies or streamers. The fly pack can store any type of fly or streamer without damaging the hackle. Preferably, the fly pack will be maintained in drum form for the secure storage of the flies or streamers. When access to the flies or streamers is desired, the angler has two options: first, the fly pack can be opened via the end caps and the interior fly nap may be accessed through either end while maintaining the fly pack in drum form; second, the fly pack can be unfastened and opened entirely for access to the flies or streamers secured upon the fly nap.

Furthermore, the fly pack constructed in accordance with the invention allows for adequate ventilation within the fly pack for speedy drying of the stored flies or streamers. With the fly pack fastened in drum form, on or more end caps may be opened to permit ambient air to circulate within the fly pack to speed the drying of the stored flies or streamers.

The fly pack constructed in accordance with the invention is preferably sized for placing on the pocket of a fishing vest, or in conjunction with a variety of attachments, clasped to a vest or creel, or attached to a belt. It is further contemplated that fly packs constructed in accordance with the invention may be of any size.

While a preferred embodiment of the invention ahs been described using specific terms, such description is for illustrative purposes only, and it is to be understood that changes and variations may be made to the fly pack constructed in accordance with the invention that can be opened at either end or unfastened and opened entirely for access to the flies or streamers secured upon the fly nap, its parts, and methods of manufacture, without departing from the spirit or scope of the flowing claims.

What is claimed is:

1. A fly pack for the temporary storage and simple retrieval of fly fishing flies, comprising:
   an openable drum including an interior drum surface and an exterior drum surface;
   a fastening for operably securing the fly pack in drum form;
   a fly nap carried by the interior drum surface for releaseably engaging the hook portion of the flies to the fly pack;

a band carried by the exterior drum surface including at least one band tip overlapping the exterior drum surface;

at least on end cap affixed to a band tip overlapping the exterior drum surface for operably enclosing a drum end when in drum form;

at least one raised billet carried by the interior drum surface for operably securing an end cap enclosing a drum end when the fly pack is in drum form;

a pull knob carried by at least one end cap to assist operably opening or enclosing a drum end with the end cap when the fly pack is in drum form; and an attachment carried by the exterior drum surface for securing the fly pack to a fisherman, whereby the fly pack can be opened and accessed at either end or unfastened and opened entirely for access to the flies secured upon the fly nap.

2. The fly pack set forth in claim 1, wherein the drum comprises weather resistant leather.

3. The fly pack set forth in claim 1, wherein the fastening comprises snap fasteners for securement to corresponding snap fastener elements.

4. The fly pack set forth in claim 1, wherein fly nap is stitched to the interior drum surface.

5. The fly pack set forth in claim 1, wherein the fly nap is bonded to the interior drum surface.

6. The fly pack set forth in claim 1, wherein the fly nap comprises wool.

7. The fly pack set forth in claim 1, wherein the fly nap comprises synthetic fleece.

8. The fly pack set forth in claim 1, wherein the band is stitched to the exterior drum surface.

9. The fly pack set forth in claim 1, wherein the band is bonded to the exterior drum surface.

10. The fly pack set forth in claim 1, wherein the band flexibly hinges about the band tips.

11. The fly pack set forth in claim 1, wherein the end cap is stitched to the band tip.

12. The fly pack set forth in claim 1, wherein the end cap is bonded to the band tip.

13. The fly pack set forth in claim 1, wherein the end cap is riveted to the band tip.

14. The fly pack set forth in claim 1, wherein the attachment further comprises a clasp for attaching the fly pack to a fisherman.

15. The fly pack set forth in claim 14, wherein the fly nap is stitched to the interior drum surface, the fly nap comprises wool, the band is stitched to the exterior drum surface and the end cap is stitched to the band tip.

16. The fly pack set forth in claim 1, wherein the attachment further comprises a belt loop capable of receiving the belt of a fisherman for attaching the fly pack to the fisherman's belt.

17. A fly pack for the temporary storage and simple retrieval of fly fishing flies, comprising:

an openable drum including and interior drum surface and an exterior drum surface;

a fastening for operably securing the fly pack in drum form;

a fly nap carried by the interior drum surface for releaseably engaging the hook portion of flies to removably secure the fly to the fly pack;

a band carried by the exterior drum surface including at least one band tip overlapping the exterior drum surface; and at least one end cap affixed to a band tip overlapping the exterior drum surface for operably enclosing a drum end when in drum form;

at least one raised billet carried by the interior drum surface for operably securing an end cap enclosing a drum end when the fly pack is in drum form; and a pull knob carried by at least one end cap to assist in operably opening or enclosing a drum end with the end cap when the fly pack is in drum form, whereby the fly pack can be opened and accessed at either end or unfastened and opened entirely for access to the flies secured upon the fly nap.

18. The fly pack set forth in claim 17, wherein the drum comprises weather resistant leather.

19. The fly pack set forth in claim 17, wherein the fastening comprises snap fasteners for securement to corresponding snap fastener elements.

20. The fly pack set forth in claim 17, wherein fly nap is stitched to the interior drum surface.

21. The fly pack set forth in claim 17, wherein the fly nap is bonded to the interior drum surface.

22. The fly pack set forth in claim 17, wherein the fly nap comprises wool.

23. The fly pack set forth in claim 17, wherein the fly nap comprises synthetic fleece.

24. The fly pack set forth in claim 17, wherein the band is stitched to the exterior drum surface.

25. The fly pack set forth in claim 17, wherein the band is bonded to the exterior drum surface.

26. The fly pack set forth in claim 17, wherein the band flexibly hinges about the band tips.

27. The fly pack set forth in claim 17, wherein the end cap is stitched to the band tip.

28. The fly pack set forth in claim 17, wherein the end cap is bonded to the band tip.

29. The fly pack set forth in claim 17, wherein the end cap is riveted to the band tip.

30. A method of manufacture of a fly pack for the temporary storage and simple retrieval of fly fishing flies, comprising the steps of:

providing an openable drum including an interior drum surface and an exterior drum surface;

providing a fastening to secure the fly pack in drum form;

providing a fly nap on the interior drum surface for releaseably engaging the hook portion of flies to removably secure the flies to the fly pack;

providing at least one raised billet carried by the interior drum surface for operably securing an end cap enclosing a drum end when the fly pack is in drum form; and providing a pull knob carried by at least one end cap to assist operably opening or enclosing a drum end with the end cap when the fly pack is in drum form.

31. The method of manufacture set forth in claim 30, wherein the drum comprises weather resistant leather.

32. The method of manufacture set forth in claim 30, wherein the fastening comprises snap fasteners for securement to corresponding snap fastener elements.

33. The method of manufacture set forth in claim 30, including the step of stitching the fly nap to the interior drum surface.

34. The method of manufacture set forth in claim 30, including the step of bonding the fly nap to the interior drum surface.

35. The method of manufacture set forth in claim 30, wherein the fly nap comprises wool.

36. The method of manufacture set forth in claim 30, wherein the fly nap comprises synthetic fleece.

37. The method of manufacture set forth in claim 30, including the step of providing a band upon the exterior drum surface including at least one band tip overlapping the exterior drum surface.

38. The method of manufacture set forth in claim 37, including the step of stitching the band to the exterior drum surface.

39. The method of manufacture set forth in claim 37, including the step of bonding the band to the exterior drum surface.

40. The method of manufacture set forth in claim 30, including the step of flexibly hinging the band about the band tips.

41. The method of manufacture set forth in claim 30, including the step of providing at least one end cap carried by at least one band tip overlapping the exterior drum surface for operably enclosing a drum end when in drum form.

42. The method of manufacture set forth in claim 41, including the step of stitching the end cap to the band tip.

43. The method of manufacture set forth in claim 41, including the step of bonding the end cap to the band tip.

44. The method of manufacture set forth in claim 41, including the step of riveting the end cap to the band tip.

45. The method of manufacture set forth in claim 30, including the step of providing an attachment carried by the exterior drum surface for securing the fly pack to a fisherman.

46. The method of manufacture set forth in claim 45, wherein the attachment further comprises a clasp for attaching the fly pack to a fisherman.

47. The method of manufacture set forth in claim 46 wherein the fly nap comprises wool, and the method further comprises the steps of:
   providing a band upon the exterior drum surface including at least one band tip overlapping the exterior drum surface;
   providing at least one end cap carried by the at least one band tip overlapping the exterior drum surface for operably enclosing a drum end when in drum form;
   stitching the fly nap to the interior drum surface;
   stitching the band to the exterior drum surface; and
   stitching the end cap to the band tip.

48. The method of manufacture set forth in claim 45, wherein the attachment further comprises a belt loop capable of receiving the belt of a fisherman for attaching the fly pack to the fisherman's belt.

* * * * *